United States Patent
Kim et al.

(10) Patent No.: US 11,945,514 B2
(45) Date of Patent: Apr. 2, 2024

(54) MODULAR STEERING SYSTEM FOR VEHICLES

(71) Applicants: HYUNDAI MOTOR COMPANY, Seoul (KR); KIA MOTORS CORPORATION, Seoul (KR)

(72) Inventors: Jong Min Kim, Gwangmyeong-si (KR); Jae kil Lee, Suwon-si (KR); Patrick Alain Hasselt, Alzenau (DE)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 823 days.

(21) Appl. No.: 17/084,207

(22) Filed: Oct. 29, 2020

(65) Prior Publication Data

US 2021/0146990 A1  May 20, 2021

(30) Foreign Application Priority Data

Nov. 15, 2019  (KR) .................. 10-2019-0146318

(51) Int. Cl.
*B62D 3/12* (2006.01)
*B62D 5/04* (2006.01)
*B62D 7/16* (2006.01)

(52) U.S. Cl.
CPC .......... *B62D 3/126* (2013.01); *B62D 5/0403* (2013.01); *B62D 7/163* (2013.01)

(58) Field of Classification Search
CPC ....... B62D 3/126; B62D 5/0403; B62D 7/163
See application file for complete search history.

(56) References Cited

U.S. PATENT DOCUMENTS

| | | | | |
|---|---|---|---|---|
| 4,144,948 A * | 3/1979 | Sergay | .................... | B62D 5/22 180/428 |
| 4,367,803 A * | 1/1983 | Wittren | .................... | B62D 5/12 92/108 |
| 5,002,142 A * | 3/1991 | Klosterhaus | ......... | B62D 5/0418 180/444 |
| 6,039,143 A * | 3/2000 | Kielar | ................. | B62D 5/0421 180/444 |
| 2008/0314678 A1* | 12/2008 | Kaku | ....................... | B62D 5/04 180/443 |
| 2015/0197273 A1* | 7/2015 | Schroeder | ............. | B62D 3/126 74/422 |

FOREIGN PATENT DOCUMENTS

CN              104768836 A  *  7/2015  ............... B62D 3/12

* cited by examiner

*Primary Examiner* — Jacob D Knutson
(74) *Attorney, Agent, or Firm* — Lempia Summerfield Katz LLC

(57) ABSTRACT

A modular steering system for vehicles can be applied in common to left-hand drive (LHD) and right-hand drive (RHD) vehicles and can avoid interference with peripheral parts. A steering housing and a reducer housing are separately provided to detachably assemble the steering housing and the reducer housing on the left or right of a rack bar housing and to adjust their mounting angles.

13 Claims, 9 Drawing Sheets

- LHD -

- RHD -

MODULAR STEERING SYSTEM FOR VEHICLES

CROSS-REFERENCE TO RELATED APPLICATION

This application claims under 35 U.S.C. § 119(a) the benefit of priority to Korean Patent Application No. 10-2019-0146318 filed on Nov. 15, 2019, the entire contents of which are incorporated herein by reference.

BACKGROUND

(a) Technical Field

The present disclosure relates to a modular steering system for vehicles. More particularly, it relates to a modular steering system for vehicles, which has an assembly structure applied in common to left-hand drive (LHD) and right-hand drive (RHD) vehicles while having a mounting structure capable of avoiding interference with peripheral parts.

(b) Background Art

In general, a power steering system for vehicles serves to reduce a force or effort required for imparting angular rotation of a steering wheel. Conventionally, a power steering method using hydraulic pressure has been used. However, a vehicle that is released recently is equipped with a rack-motor driven power steering (R-MDPS) to change the steering force depending on the traveling speed of the vehicle.

FIG. 1 illustrates an example of a conventional R-MDPS type system, wherein reference numeral 10 designates a rack housing.

The rack housing 10 is provided therein with a rack bar transported in left and right directions. The rack housing 10 is mounted at a predetermined position of a vehicle body.

The rack housing 10 is formed, at one side thereof, integrally with a steering housing 20 and, at the other side thereof, integrally with a reducer housing 30.

For reference, a pinion steering gear, which is rotatably engaged with the rack bar in the rack housing 10, is rotatably mounted in the steering housing 20. A pinion output gear, which is engaged with the rack bar in the rack housing 10, is rotatably mounted in the reducer housing 30.

In this case, the steering gear mounted in the steering housing 20 is connected via a steering column or the like to a steering wheel for allowing a driver to operate steering. A motor 32 for applying torque to the output gear is mounted in the reducer housing 30.

In addition, a tie rod 40 is connected to both ends of the rack bar and both ends of the tie rod 40 are connected to knuckle components connected to drive wheels via a ball joint 42 or the like.

Accordingly, when the driver steers the steering wheel, a steering force is applied to the rack bar in the rack housing 10 while the steering gear in the steering housing 20 rotates.

At the same time, when a controller drives the motor 32 in response to the steering signal received thereto, a steering force is transmitted to the rack bar in the rack housing 10 while the output gear in the reducer housing 30 rotates.

However, the conventional R-MDPS type system has the following problems.

First, since separate rack housings must be manufactured for LHD and RHD vehicles, it is costly to manufacture molds and a lot of production man-hours are required.

In the LHD vehicle in which a driver's seat and a steering wheel are positioned on the left of the vehicle, when it is intended to manufacture a rack housing using a mold, the rack housing must be manufactured to have an one-piece structure in which a steering housing is integrally formed on the left of the rack housing while a reducer housing is integrally formed on the right of the rack housing. On the other hand, in the RHD vehicle in which a driver's seat and a steering wheel are positioned on the right of the vehicle, when it is intended to manufacture a rack housing using a mold, the rack housing must be manufactured to have an one-piece structure in which a steering housing is integrally formed on the right of the rack housing while a reducer housing is integrally formed on the left of the rack housing. Hence, it is costly to manufacture molds and a lot of production man-hours are required.

Second, as the rack housing or the like is manufactured to have a single shape designed in advance using the mold, it is impossible to change the mounting direction and position of the rack housing or the like, which may cause interference with peripheral parts.

Third, although the steering housing has a predetermined angle of inclination for connection with the steering column and the steering wheel, it is impossible to adjust the angle of inclination as the steering housing is integrally formed in the rack housing.

The steering housing should have different angles of inclination for connection with a steering column and a steering wheel having different specifications for each vehicle model. However, it is impossible to adjust the angle of inclination of the steering housing, as the steering housing is integrally formed in the rack housing. As a result, a separate mold for manufacturing the rack housing has to be manufactured to adjust the angle of inclination of the steering housing.

The above information disclosed in this Background section is only to enhance understanding of the background of the disclosure. Therefore, the Background section may contain information that does not form the prior art that is already known in this country to a person of ordinary skill in the art.

SUMMARY OF THE DISCLOSURE

The present disclosure has been made in an effort to solve the above-described problems associated with the prior art.

In an aspect, the present disclosure provides a modular steering system, which can be applied in common to left-hand drive (LHD) and right-hand drive (RHD) vehicles. The modular steering system avoids interference with peripheral parts by separately providing a steering housing and a reducer housing to detachably assemble the steering housing and the reducer housing on the left or right of a rack bar housing and to adjust their mounting angles.

The present disclosure provides a modular steering system for vehicles. The modular steering system includes a tie rod housing and first and second inner brackets formed at both ends of the tie rod housing and each having the same structure. The first and second inner brackets are mounted to a vehicle body. The modular steering system also includes a first outer bracket spaced apart from the first inner bracket and mounted to the vehicle body and a second outer bracket spaced apart from the second inner bracket and mounted to the vehicle body. The modular steering system also includes a steering housing mounted to be adjustable in angle between the first inner bracket and the first outer bracket in an LHD vehicle and mounted to be adjustable in angle between the second inner bracket and the second outer bracket in an RHD vehicle. The modular steering system also includes a reducer housing mounted to be adjustable in angle between the second inner bracket and the second outer bracket in the LHD vehicle and mounted to be adjustable in angle between the first inner bracket and the first outer bracket in the RHD vehicle.

The modular steering system may further include: a first rack bar housing mounted to an inner end of the steering housing; a first rack bar disposed to be transportable in left and right directions in the first rack bar housing; a second rack bar housing mounted to an inner end of the reducer housing; a second rack bar disposed to be transportable in the left and right directions in the second rack bar housing; a tie rod disposed to be transportable in the left and right directions in the tie rod housing; a first steering bracket connected between the first rack bar and one end of the tie rod; and a second steering bracket connected between the second rack bar and the other end of the tie rod.

Each of the first and second inner brackets may be configured to have a first vehicle body mounting end formed at its front end. The first vehicle body mounting end may have a mounting hole. Each of the first and second inner brackets may also be configured to have a first housing connecting end formed at its rear end thereof. The first housing connecting ends may be fastened to the steering housing or the reducer housing. The tie rod housing may be integrally formed at the middle between the front end and the rear end.

Each of the steering housing and the reducer housing may have a first male spline formed on its inner end. The first housing connecting end of each of the first and second inner brackets may have a first female spline detachably fastened to the first male spline.

Each of the first and second outer brackets may be configured to have a second housing connecting end formed at its front end. The second housing connecting end may be fastened to the steering housing or the reducer housing. Each of the first and second outer brackets may also be configured to have a second vehicle body mounting end formed at its rear end. The second vehicle body mounting ends may be a mounting hole.

Each of the steering housing and the reducer housing may have a second male spline formed on its outer end. The second housing connecting end of each of the first and second outer brackets may have a second female spline detachably fastened to the second male spline.

The first rack bar housing may be press-fitted to an inner diameter of the inner end of the steering housing to be disposed in parallel with the tie rod housing.

The second rack bar housing may be press-fitted to an inner diameter of the inner end of the reducer housing to be disposed in parallel with the tie rod housing.

The first and second rack bar housings may be spaced apart from each other by a predetermined distance on the same axis.

A first bellows-shaped dust cover may be mounted between the first steering bracket and an outer end of the steering housing to cover the first rack bar.

A second bellows-shaped dust cover may be mounted between the second steering bracket and an outer end of the reducer housing to cover the second rack bar.

Each of the first and second steering brackets may include: a tie rod connecting end connected to the tie rod; a rack bar connecting end connected to an associated one of the rack bars; and a bending plate configured to integrally interconnect the tie rod connecting end and the rack bar connecting end.

The reducer housing may have a motor mounted therein for transmission of power.

Other aspects and embodiments of the disclosure are discussed below.

It should be understood that the term "vehicle" or "vehicular" or other similar terms, as used herein, are inclusive of motor vehicles in general. Such motor vehicles may be: passenger automobiles including sports utility vehicles (SUV), buses, trucks, and various commercial vehicles; watercraft including a variety of boats and ships; aircraft and the like; and alternative powered vehicles including hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, vehicles that are both gasoline-powered and electric-powered.

The above and other features of the disclosure are discussed below.

BRIEF DESCRIPTION OF THE DRAWINGS

The above and other features of the present disclosure are now described in detail with reference to certain embodiments thereof illustrated the accompanying drawings, which are given hereinbelow by way of illustration only, and thus are not limitative of the present disclosure, and wherein.

Figure 1:
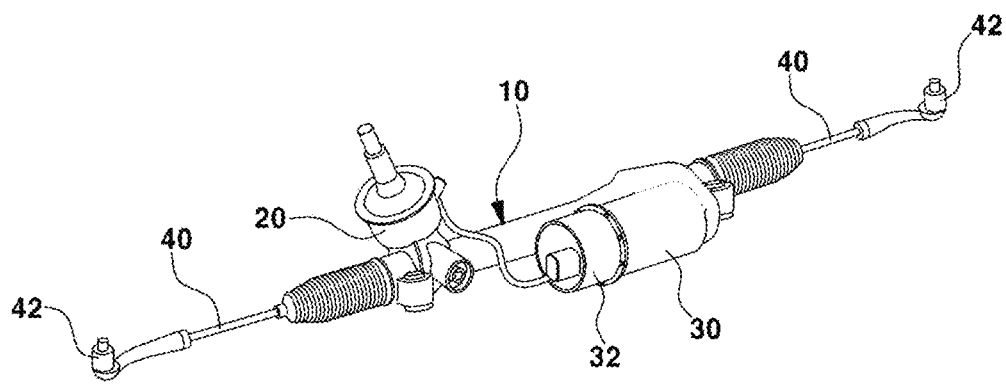
FIG. 1 is a schematic view illustrating a conventional rack-type power steering system, i.e., a rack-motor driven power steering (R-MDPS)
Figure 2:
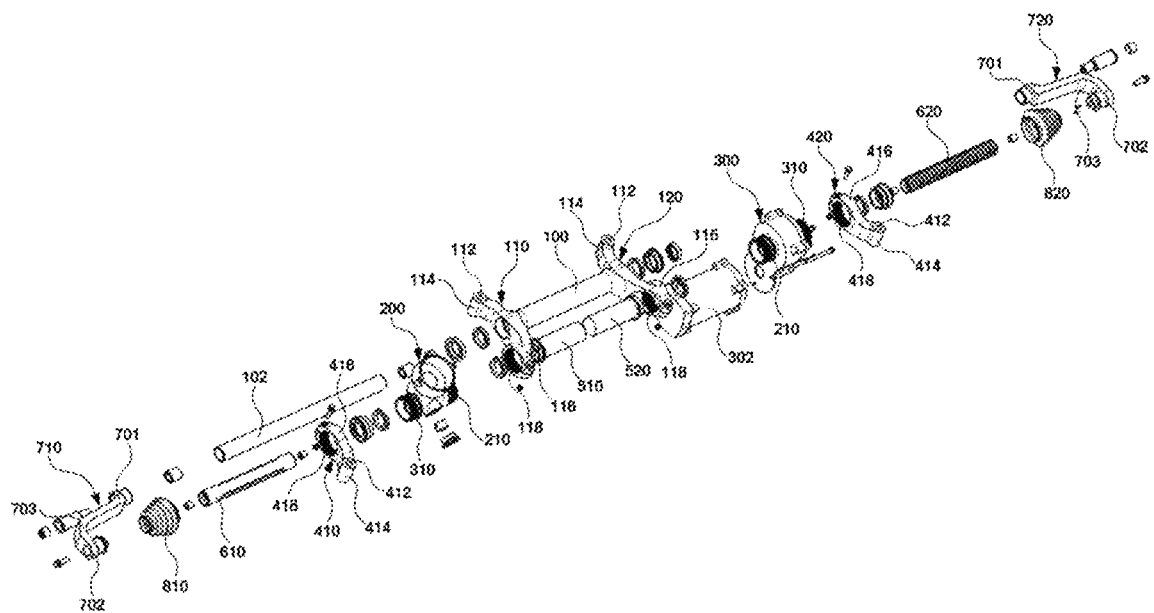
FIG. 2 is an exploded perspective view illustrating a modular steering system for vehicles according to the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, like reference numbers refer to the same or equivalent parts of the present disclosure throughout the several figures of the drawing.

DETAILED DESCRIPTION

Hereinafter, reference is made in detail to various embodiments of the present disclosure, examples of which are illustrated in the accompanying drawings and described below. While the disclosure is described in conjunction with specific embodiments, it should be understood that the present description is not intended to limit the disclosure to those embodiments. On the contrary, the disclosure is intended to cover not only the specific disclosed embodiments, but also various alternatives, modifications, equivalents, and other embodiments, which may be included within the spirit and scope of the disclosure as defined by the appended claims.

FIGS. 2-9 illustrate a modular steering system for vehicles according to the present disclosure, in which reference numeral 100 designates a tie rod housing.

The tie rod housing 100 is in the form of a hollow pipe and is configured such that a tie rod 102 is disposed therein to be transportable in left and right directions.

A first inner bracket 110 and a second inner bracket 120, which have the same shape and structure, are integrally formed at both ends of the tie rod housing 100.

Each of the first and second inner brackets 110 and 120 has a first vehicle body mounting end 114 that is formed at the front end thereof and each has a mounting hole 112. Each inner bracket 110 and 120 also has a first housing connecting end 116 that is formed at the rear end thereof and fastened to a steering housing 200 or a reducer housing 300.

One end of the tie rod housing 100 is integrally formed at the middle between the front end and the rear end of each of the first and second inner brackets 110 and 120.

Figure 3:
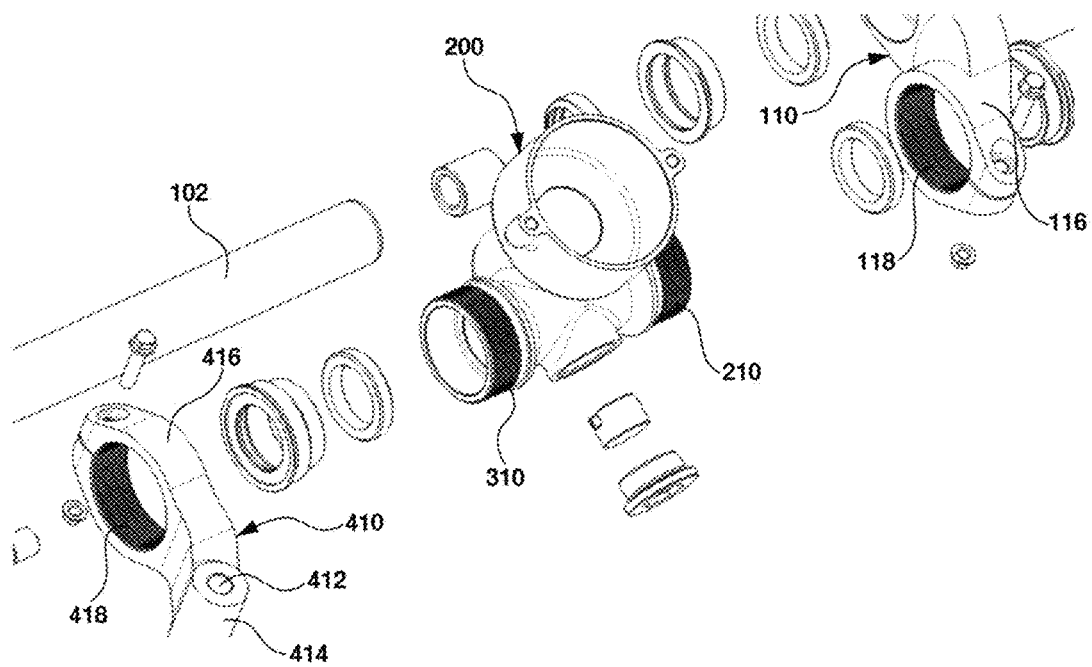
FIG. 3 is an exploded perspective view illustrating an assembly structure of a steering housing in the modular steering system for vehicles according to the present disclosure.
Figure 4:
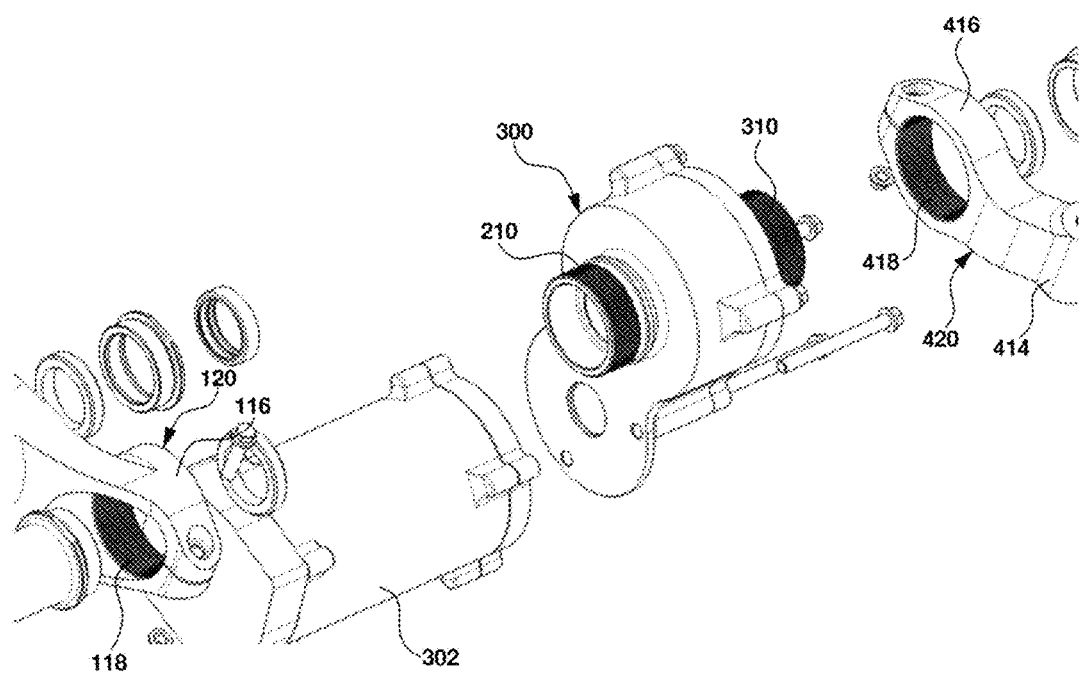
FIG. 4 is an exploded perspective view illustrating an assembly structure of a reducer housing in the modular steering system for vehicles according to the present disclosure.
Figure 5:
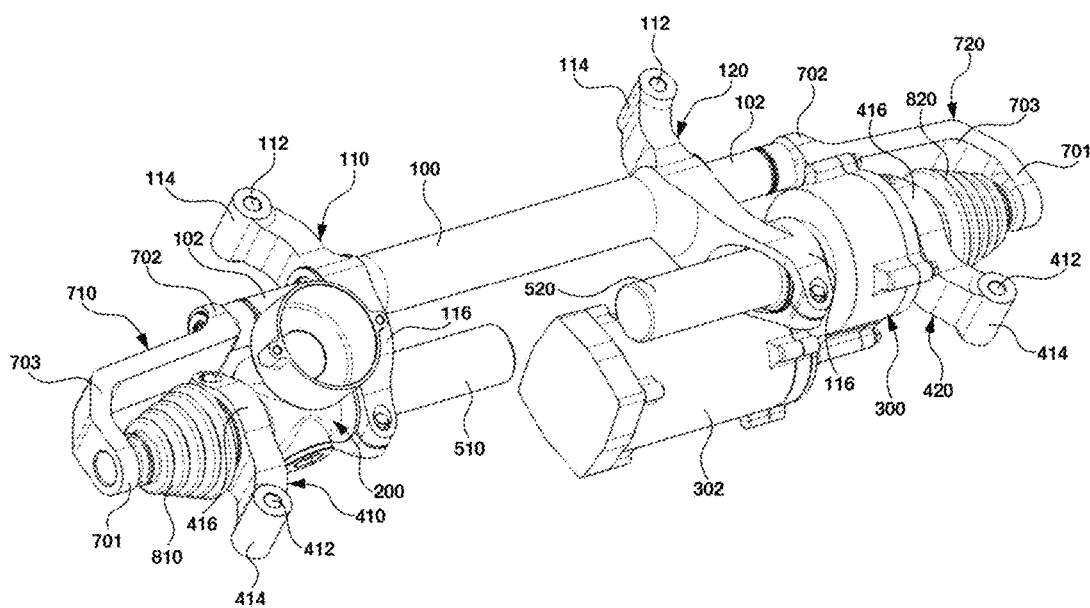
FIGS. 5 and 6 are assembled perspective views illustrating the modular steering system for vehicles according to the present disclosure.
Figure 6:
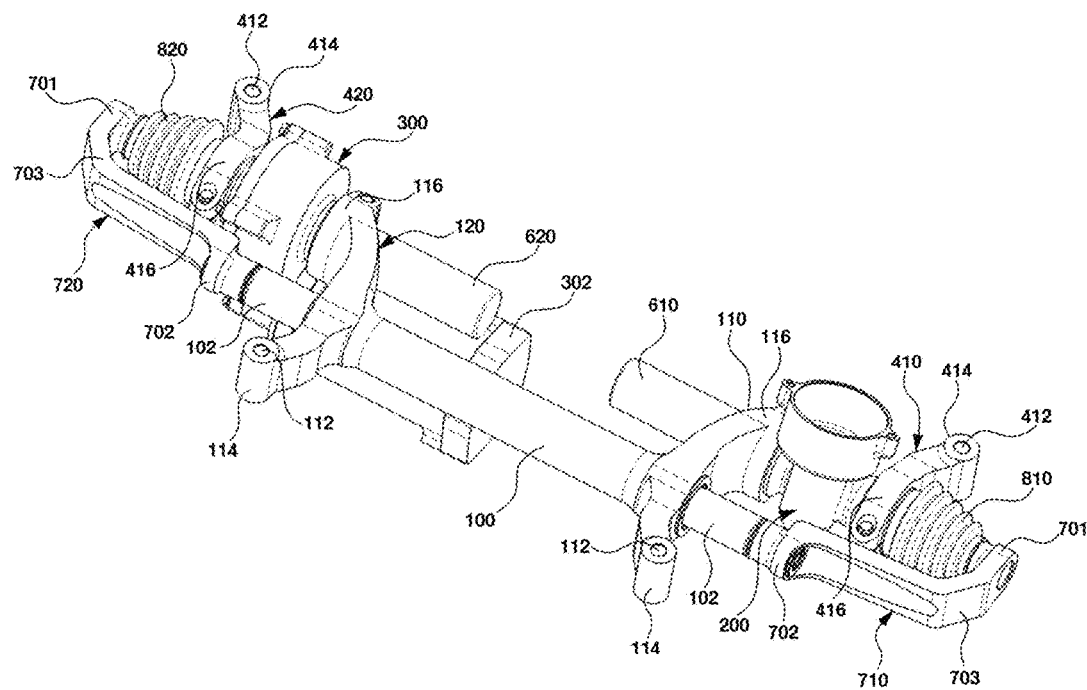

As illustrated in FIGS. 3 and 4, each of the steering housing 200 and the reducer housing 300 has a first male spline 210 formed on the inner end thereof. The first housing connecting end 116 of each of the first and second inner brackets 110 and 120 has a first female spline 118 that is detachably fastened to the first male spline 210.

A first outer bracket 410, which is mounted to a vehicle body with the steering housing 200 or the reducer housing 300 interposed therebetween, is spaced outward from the first inner bracket 110. A second outer bracket 420, which is mounted to the vehicle body with the steering housing 200 or the reducer housing 300 interposed therebetween, is spaced outward from the second inner bracket 120.

Each of the first and second outer brackets 410 and 420 has a second housing connecting end 416 that is formed at the front end thereof and fastened to the steering housing 200 or the reducer housing 300. Each of the outer brackets 410 and 420 also has a second vehicle body mounting end 414 that is formed at the rear end thereof and has a mounting hole 412.

As illustrated in FIGS. 3 and 4, each of the steering housing 200 and the reducer housing 300 has a second male spline 310 formed on the outer end thereof. The second housing connecting end 416 of each of the first and second outer brackets 410 and 420 has a second female spline 418 that is detachably fastened to the second male spline 310.

Figure 10:
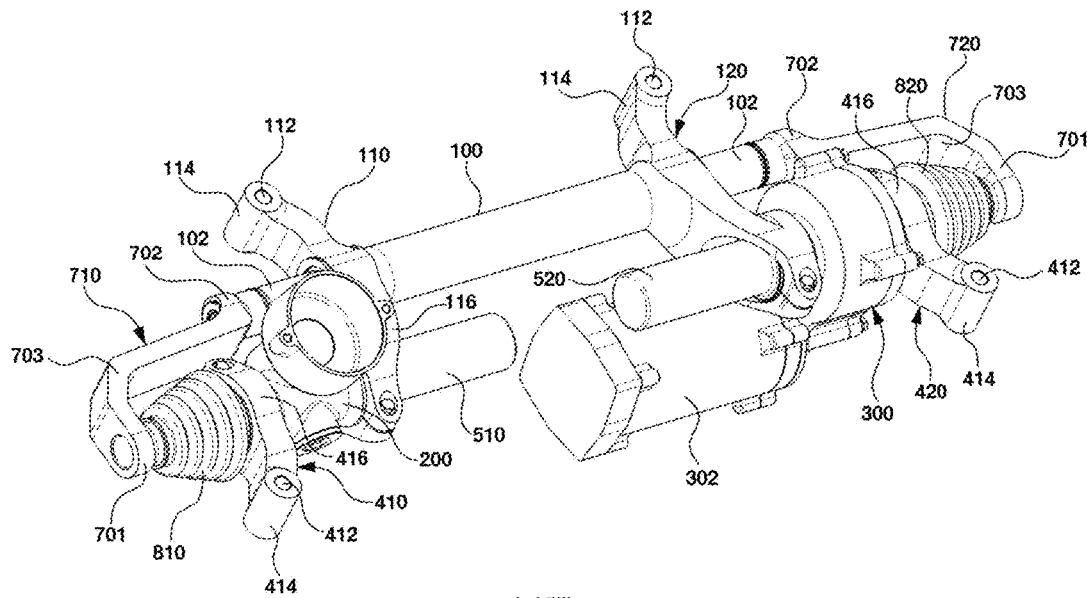
FIG. 10 is an assembled perspective view illustrating a state in which the modular steering system for vehicles according to the present disclosure is applied to a left-hand drive (LHD) vehicle.

Accordingly, in the case of a left-hand drive (LHD) vehicle, as illustrated in FIG. 10, the steering housing 200 may be mounted to be adjustable in angle between the first inner bracket 110 and the first outer bracket 410. The reducer housing 300 may also be mounted to be adjustable in angle between the second inner bracket 120 and the second outer bracket 420.

In other words, the first male spline 210 formed on the inner end of the steering housing 200 is inserted into and fastened to the first female spline 118 formed on the first housing connecting end 116 of the first inner bracket 110. The second male spline 310 formed on the outer end of the steering housing 200 is likewise inserted into and fastened to the second female spline 418 formed on the second housing connecting end 416 of the first outer bracket 410. By doing so, the steering housing 200 may be mounted to be adjustable in angle between the first inner bracket 110 and the first outer bracket 410.

In addition, the first male spline 210 formed on the inner end of the reducer housing 300 is inserted into and fastened to the first female spline 118 formed on the first housing connecting end 116 of the second inner bracket 120. Likewise, the second male spline 310 formed on the outer end of the reducer housing 300 is inserted into and fastened to the second female spline 418 formed on the second housing connecting end 416 of the second outer bracket 420. By doing so, the reducer housing 300 may be mounted to be adjustable in angle between the second inner bracket 120 and the second outer bracket 420.

Figure 11:
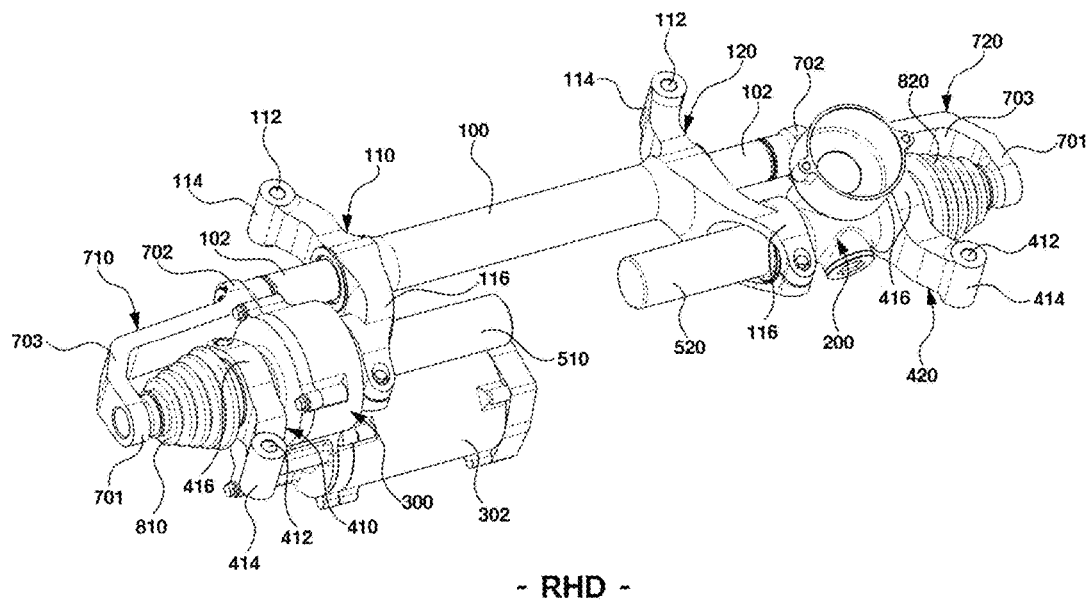
FIG. 11 is an assembled perspective view illustrating a state in which the modular steering system for vehicles according to the present disclosure is applied to a right-hand drive (RHD) vehicle.

On the other hand, in the case of a right-hand drive (RHD) vehicle, as illustrated in FIG. 11, the steering housing 200 may be mounted to be adjustable in angle between the second inner bracket 120 and the second outer bracket 420. The reducer housing 300 may also be mounted to be adjustable in angle between the first inner bracket 110 and the first outer bracket 410.

In other words, the first male spline 210 formed on the inner end of the steering housing 200 is inserted into and fastened to the first female spline 118 formed on the first housing connecting end 116 of the second inner bracket 120. Likewise, the second male spline 310 formed on the outer end of the steering housing 200 is inserted into and fastened to the second female spline 418 formed on the second housing connecting end 416 of the second outer bracket 420. By doing so, the steering housing 200 may be mounted to be adjustable in angle between the second inner bracket 120 and the second outer bracket 420.

In addition, the first male spline 210 formed on the inner end of the reducer housing 300 is inserted into and fastened to the first female spline 118 formed on the first housing connecting end 116 of the first inner bracket 110. Likewise, the second male spline 310 formed on the outer end of the reducer housing 300 is inserted into and fastened to the second female spline 418 formed on the second housing connecting end 416 of the first outer bracket 410. By doing so, the reducer housing 300 may be mounted to be adjustable in angle between the first inner bracket 110 and the first outer bracket 410.

Figure 7:
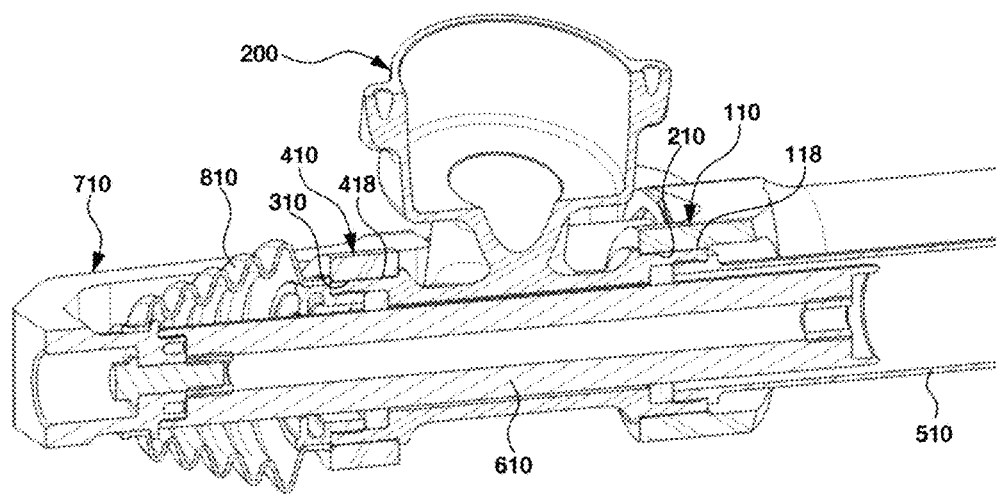
FIG. 7 is a cross-sectional view illustrating an assembly structure between the steering housing and its internal components in the modular steering system for vehicles according to the present disclosure.

A first rack bar housing 510 is connected to the inner end of the steering housing 200. A first rack bar 610 is disposed to be transportable in left and right directions in the first rack bar housing 510, as illustrated in FIG. 7.

For reference, a pinion steering gear installed in the steering housing 200 engages with the first rack bar 610 disposed in the first rack bar housing 510.

Figure 8:
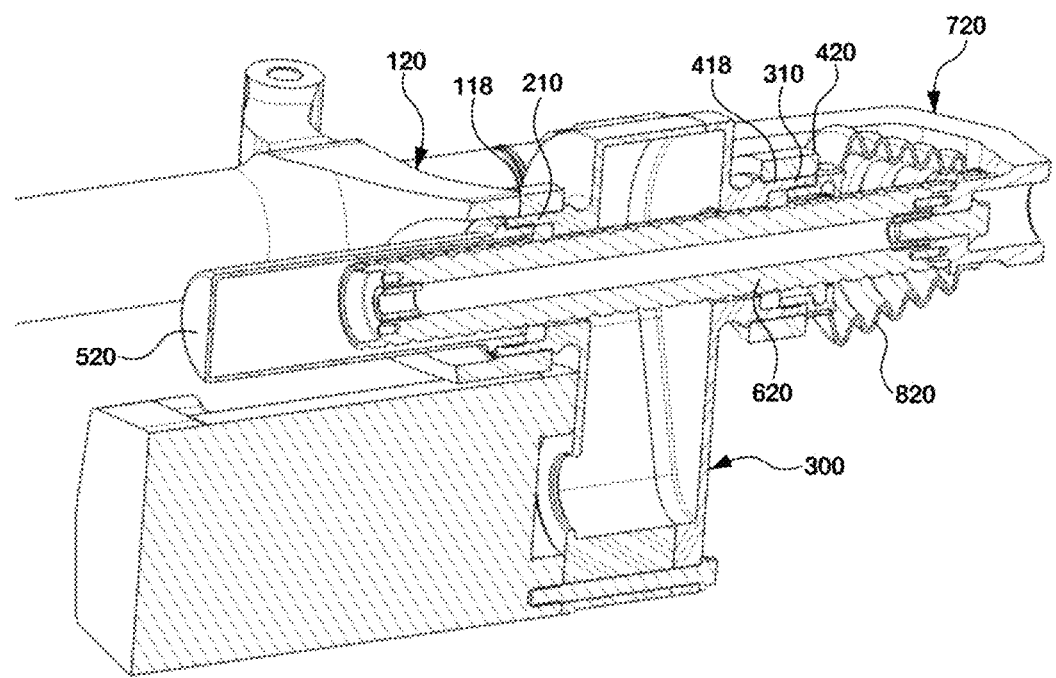
FIG. 8 is a cross-sectional view illustrating an assembly structure between the reducer housing and its internal components in the modular steering system for vehicles according to the present disclosure.
Figure 9:
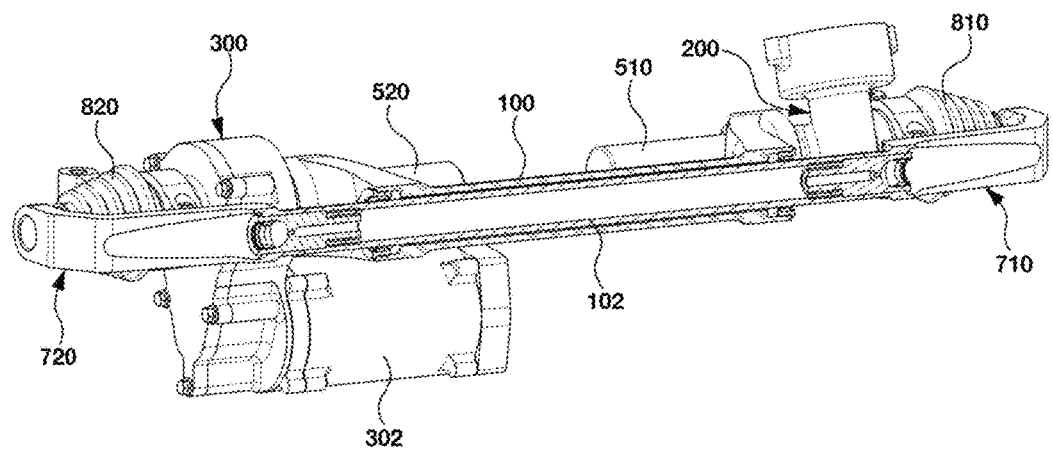
FIG. 9 is a cross-sectional view illustrating a tie rod housing and a tie rod therein in the modular steering system for vehicles according to the present disclosure.

A second rack bar housing 520 is connected to the inner end of the reducer housing 300. A second rack bar 620 is disposed to be transportable in left and right directions in the second rack bar housing 520, as illustrated in FIG. 8.

For reference, a pinion output gear installed in the reducer housing 300 engages with the second rack bar 620 disposed in the second rack bar housing 520.

In this case, the first rack bar housing 510 is press-fitted to the inner diameter of the inner end of the steering housing 200 and the second rack bar housing 520 is press-fitted to the inner diameter of the inner end of the reducer housing 300. Thus, the first and second rack bar housings 510 and 520 are spaced apart from each other by a predetermined distance on the same axis while being arranged in parallel with the tie rod housing 100.

In other words, the tie rod housing 100 is disposed on one axis and the first and second rack bar housings 510 and 520 are disposed on the other axis and in parallel with the tie rod housing 100. This results in the tie rod housing 100 and the first and second rack bar housings 510 and 520 forming a double axis arrangement.

A first steering bracket 710 is connected between the first rack bar 610 and one end of the tie rod 102. A second steering bracket 720 is connected between the second rack bar 620 and the other end of the tie rod 102.

In order to easily interconnect the rack bars 610 and 620 and the tie rod housing 100, arranged on the different axes as described above, each of the first and second steering brackets 710 and 720 may include: a tie rod connecting end 701 connected to the tie rod 102; a rack bar connecting end 702 connected to the associated rack bar 610 or 620; and a bending plate 703 that integrally interconnects the tie rod connecting end 701 and the rack bar connecting end 702.

The reducer housing 300 has a motor 302 mounted therein for transmission of power.

A first bellows-shaped dust cover 810 is mounted between the first steering bracket 710 and the outer end of the steering housing 200 to cover the first rack bar 610. A second bellows-shaped dust cover 820 is mounted between the second steering bracket 720 and the outer end of the reducer housing 300 to cover the second rack bar 620.

The tie rod 102 has tie rod ends extending from both ends thereof. The tie rod ends may be fastened to knuckle components connected to drive wheels.

Hereinafter, the operation of the modular steering system according to the present disclosure having the above configuration is described.

First, when a driver steers a steering wheel, a steering force is applied to the first rack bar 610 in the first rack bar housing 510 while the steering gear in the steering housing 200 rotates.

At the same time, when a controller drives the motor 302 in response to the steering signal received thereto, a steering force is transmitted in the same direction to the second rack bar 620 in the second rack bar housing 520 while the output gear in the reducer housing 300 rotates.

Subsequently, the first rack bar 610 and the first steering bracket 710 are moved in one direction while the tie rod 102 connected to the first steering bracket 710 is moved in one direction.

At the same time, the second rack bar 620 and the second steering bracket 720 are moved in the same direction by the power of the motor while the second steering bracket 720 serves to assist a steering force for pushing the tie rod 102 in the same direction.

Hereinafter, the arrangement structure of the modular steering system according to the present disclosure for each vehicle model is described.

FIG. 10 illustrates a state in which the modular steering system for vehicles according to the present disclosure is applied to the LHD vehicle. FIG. 11 illustrates a state in which the modular steering system for vehicles according to the present disclosure is applied to the RHD vehicle.

As illustrated in FIG. 10, in the case of the LHD vehicle, the steering housing 200 may be mounted to be adjustable in angle between the first inner bracket 110 and the first outer bracket 410. The reducer housing 300 may also be mounted to be adjustable in angle between the second inner bracket 120 and the second outer bracket 420.

As illustrated in FIG. 11, in the case of the RHD vehicle, the steering housing 200 may be mounted to be adjustable in angle between the second inner bracket 120 and the second outer bracket 420. The reducer housing 300 may also be mounted to be adjustable in angle between the first inner bracket 110 and the first outer bracket 410.

Thus, it is possible to provide the steering system that is applicable in common to the LHD and RHD vehicles by separately providing the steering housing 200 and the reducer housing 300 to detachably assemble them on the left or right side according to the position of the driver's seat for each vehicle model.

Figure 12:
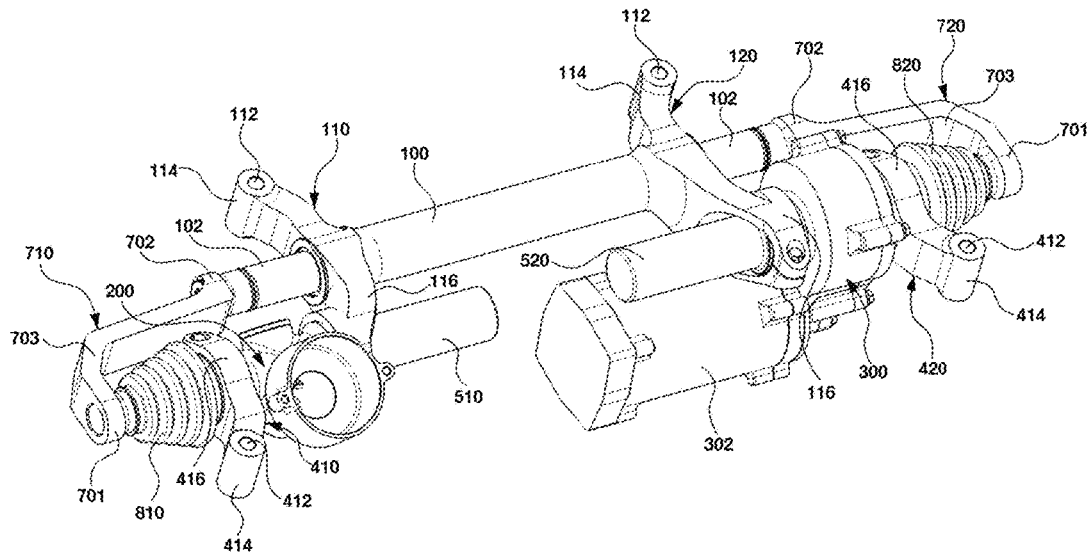
FIG. 12 is an assembled perspective view illustrating a state in which the steering housing is rotated 180° from its mounted state illustrated in FIG. 10 by adjusting its mounting angle in the modular steering system for vehicles according to the present disclosure.
Figure 13:
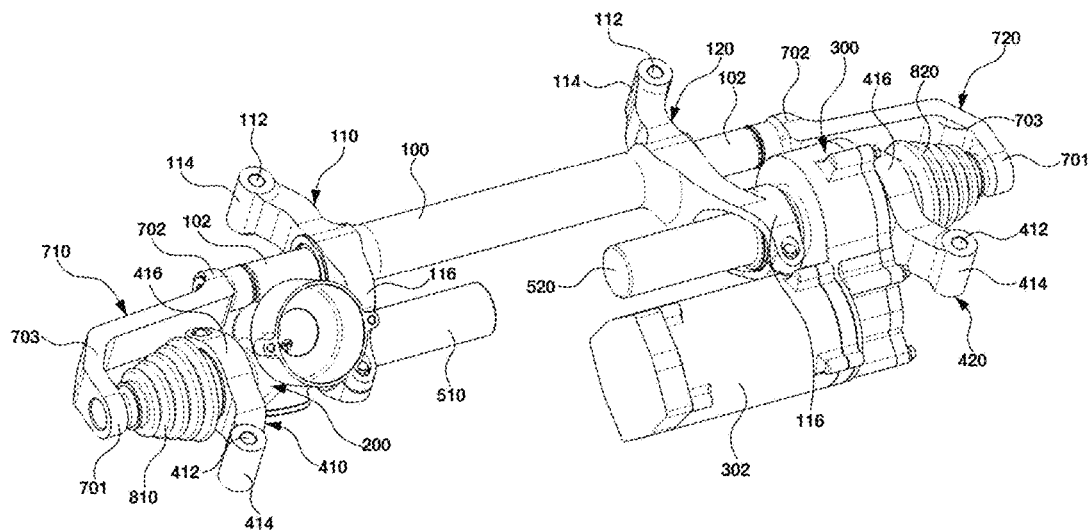
FIG. 13 is an assembled perspective view illustrating an example in which mounting angles of the steering housing and the reducer housing are adjusted together in the modular steering system for vehicles according to the present disclosure.
Figure 14:
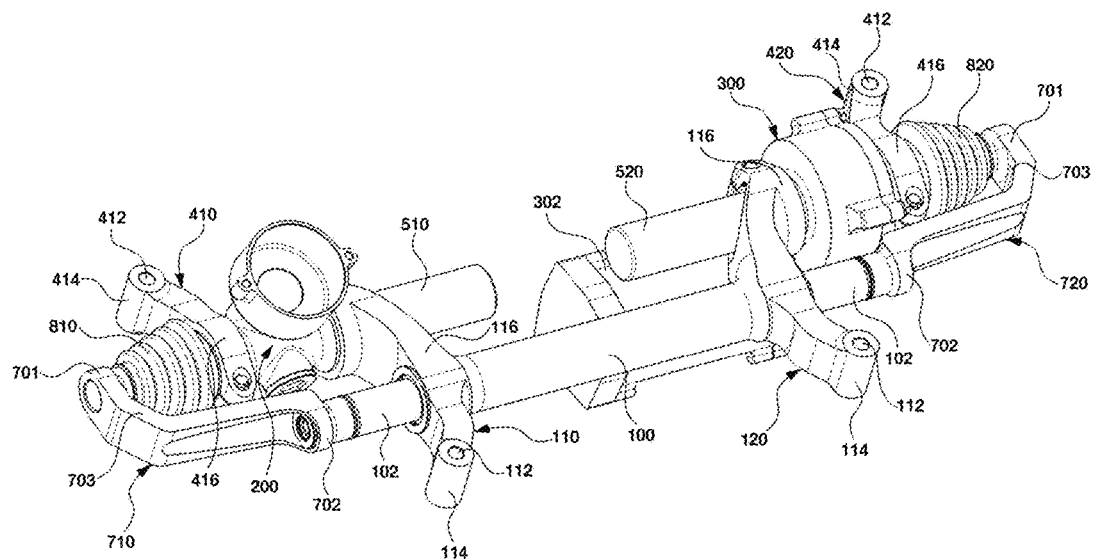
FIG. 14 is an assembled perspective view illustrating an example in which an arrangement position of the modular steering system for vehicles according to the present disclosure is reversed and adjusted around the tie rod housing.

FIG. 12 illustrates a state in which the steering housing is rotated 180° from its mounted state illustrated in FIG. 10 by adjusting its mounting angle in the modular steering system for vehicles according to the present disclosure. FIG. 13 illustrates an example in which the mounting angles of the steering housing and the reducer housing are adjusted together in the modular steering system for vehicles according to the present disclosure. FIG. 14 illustrates an example in which the arrangement position of the modular steering system for vehicles according to the present disclosure is reversed and adjusted around the tie rod housing.

As illustrated in FIG. 12, one should consider that the steering column and the steering wheel have different angles of inclination for each vehicle model. Thus, it is possible to adjust the mounting angle of the steering housing 200 up to 180° using the spline coupling structure such that the individual components of the steering system are easily disposed on the vehicle body without interference with peripheral parts.

As illustrated in FIG. 13, again one should consider that the steering column and the steering wheel have different angles of inclination for each vehicle model. Thus, it is possible to simultaneously adjust the mounting angle of the steering housing 200 and the mounting angle of the reducer housing 300 using the spline coupling structure such that the individual components of the steering system are easily disposed on the vehicle body without interference with peripheral parts.

As illustrated in FIG. 14, it is possible to rearrange the steering housing 200, the reducer housing 300, and the like by reversing and rotating them to an opposite position around the tie rod housing 100. Thus, the individual components of the steering system are easily disposed on the vehicle body without interference with peripheral parts while easily securing a space for packaging the components of the steering system for each vehicle model.

In accordance with the disclosed embodiments, the present disclosure provides the following effects.

First, it is possible to provide the steering system that is applicable in common to the LHD and RHD vehicles by separately providing the steering housing and the reducer housing to detachably assemble the steering housing and the reducer housing on the left or right of the rack bar housing.

Second, the mounting angles of the steering housing and the reducer housing are adjustable when they are mounted to the rack bar housing. Thus, it is possible to easily adjust the angle of inclination of the steering housing to an angle for connection with different steering columns and steering wheels for each vehicle model and to avoid interference of the steering housing and the reducer housing with peripheral parts.

The disclosure has been described in detail with reference to various embodiments thereof. However, it should be appreciated by those having ordinary skill in the art that changes may be made in these embodiments without departing from the principles and spirit of the disclosure, the scope of which is defined in the appended claims and their equivalents.

What is claimed is:

1. A modular steering system for vehicles, the modular steering system comprising:
 a tie rod housing;
 first and second inner brackets formed at both ends of the tie rod housing and each having the same structure, the first and second inner brackets being mounted to a vehicle body;
 a first outer bracket spaced apart from the first inner bracket and mounted to the vehicle body;
 a second outer bracket spaced apart from the second inner bracket and mounted to the vehicle body;
 a steering housing configured to be mounted to be adjustable in angle between the first inner bracket and the first outer bracket in a left-hand drive (LHD) vehicle and mounted to be adjustable in angle between the second inner bracket and the second outer bracket in a right-hand drive (RHD) vehicle; and
 a reducer housing configured to be mounted to be adjustable in angle between the second inner bracket and the second outer bracket in the LHD vehicle and mounted to be adjustable in angle between the first inner bracket and the first outer bracket in the RHD vehicle.

2. The modular steering system of claim 1, further comprising:
 a first rack bar housing mounted to an inner end of the steering housing;
 a first rack bar disposed to be transportable in left and right directions in the first rack bar housing;
 a second rack bar housing mounted to an inner end of the reducer housing;
 a second rack bar disposed to be transportable in the left and right directions in the second rack bar housing;
 a tie rod disposed to be transportable in the left and right directions in the tie rod housing;
 a first steering bracket connected between the first rack bar and one end of the tie rod; and
 a second steering bracket connected between the second rack bar and the other end of the tie rod.

3. The modular steering system of claim 2, wherein the first rack bar housing is press-fitted to an inner diameter of an inner end of the steering housing to be disposed in parallel with the tie rod housing.

4. The modular steering system of claim 2, wherein the second rack bar housing is press-fitted to an inner diameter of an inner end of the reducer housing to be disposed in parallel with the tie rod housing.

5. The modular steering system of claim 2, wherein the first and second rack bar housings are spaced apart from each other by a predetermined distance on the same axis.

6. The modular steering system of claim 2, wherein a first bellows-shaped dust cover is mounted between the first steering bracket and an outer end of the steering housing to cover the first rack bar.

7. The modular steering system of claim 2, wherein a second bellows-shaped dust cover is mounted between the second steering bracket and an outer end of the reducer housing to cover the second rack bar.

8. The modular steering system of claim 2, wherein each of the first and second steering brackets comprises: a tie rod connecting end connected to the tie rod; a rack bar connecting end connected to an associated one of the rack bars; and a bending plate configured to integrally interconnect the tie rod connecting end and the rack bar connecting end.

9. The modular steering system of claim 1, wherein each of the first and second inner brackets is configured to have a first vehicle body mounting end formed at a front end of each of the first and second inner brackets, each first vehicle body mounting end having a mounting hole, and is configured to have a first housing connecting end formed at a rear end of each of the first and second inner brackets, each first housing connecting end being fastened to the steering housing or the reducer housing, and wherein the tie rod housing is integrally formed at the middle between the front end and the rear end.

10. The modular steering system of claim 9, wherein each of the steering housing and the reducer housing has a first male spline formed on an inner end of each of the steering housing and the reducer housing, and wherein the first housing connecting end of each of the first and second inner brackets has a first female spline detachably fastened to the first male spline.

11. The modular steering system of claim 1, wherein each of the first and second outer brackets is configured to have a second housing connecting end formed at a front end of each of the first and second outer brackets, the second housing connecting end being fastened to the steering housing or the reducer housing, and is configured to have a second vehicle body mounting end formed at a rear end of each of the first and second outer brackets, the second vehicle body mounting end having a mounting hole.

12. The modular steering system of claim 11, wherein each of the steering housing and the reducer housing has a second male spline formed on an outer end of each of the steering housing and the reducer housing, and wherein the second housing connecting end of each of the first and second outer brackets has a second female spline detachably fastened to the second male spline.

13. The modular steering system of claim 1, wherein the reducer housing has a motor mounted therein for transmission of power.

\* \* \* \* \*